(12) United States Patent
Daniel et al.

(10) Patent No.: US 7,751,667 B2
(45) Date of Patent: Jul. 6, 2010

(54) MICROFABRICATED LIGHT COLLIMATING SCREEN

(75) Inventors: Jurgen H. Daniel, San Francisco, CA (US); David K. Biegelsen, Portola Valley, CA (US)

(73) Assignee: Xerox Corporation, Norwalk, CT (US)

( * ) Notice: Subject to any disclaimer, the term of this patent is extended or adjusted under 35 U.S.C. 154(b) by 517 days.

(21) Appl. No.: 11/314,213

(22) Filed: Dec. 21, 2005

(65) Prior Publication Data
US 2007/0139765 A1 Jun. 21, 2007

(51) Int. Cl.
G02B 6/06 (2006.01)
G02B 27/30 (2006.01)
C08F 2/46 (2006.01)

(52) U.S. Cl. ............ 385/116; 385/115; 385/120; 385/141; 385/901; 359/641; 359/443; 427/487

(58) Field of Classification Search .......... 385/115, 385/116, 120, 129, 130, 131, 141, 901, 147; 359/641, 443; 156/331.8; 427/487; 428/463
See application file for complete search history.

(56) References Cited

U.S. PATENT DOCUMENTS

| 5,981,959 | A | 11/1999 | Apte | 250/483.1 |
|---|---|---|---|---|
| 6,398,370 | B1* | 6/2002 | Chiu et al. | 359/613 |
| 6,476,376 | B1* | 11/2002 | Biegelsen et al. | 250/221 |
| 7,050,227 | B2* | 5/2006 | Olofson et al. | 359/443 |
| 7,142,361 | B2* | 11/2006 | Olofson et al. | 359/452 |
| 7,194,170 | B2* | 3/2007 | Biegelsen | 385/116 |
| 2002/0043633 | A1* | 4/2002 | Jackson et al. | 250/559.36 |
| 2005/0156839 | A1* | 7/2005 | Webb | 345/87 |
| 2006/0093292 | A1* | 5/2006 | Biegelsen | 385/120 |
| 2007/0139765 | A1* | 6/2007 | Daniel et al. | 359/443 |

OTHER PUBLICATIONS

Kuo-Yung Hung et al., "Application of 3D Glycerol-Compensated Inclined-Exposure Technology to an Integrated Optical Pick-Up Head," Journal of Micromechanics and Microengineering, 14, pp. 975-983, 2004.

C. B. McArdle, "Functional Dyes in Electro-Optic and Imaging Applications," Pure & Appl. Chem., vol. 68, No. 7, pp. 1389-1394, 1996.

* cited by examiner

*Primary Examiner*—Brian M Healy
(74) *Attorney, Agent, or Firm*—Fay Sharpe LLP (57) ABSTRACT

A microfabricated light collimating screen is provided. A microfabricated screen, in one form, is made from a photopolymer such as SU-8 material. It is able to collimate light in two dimensions and for improved degrees of collimation. It may also be directly patterned onto image sensors or light sources in order to achieve direct collimation. The fabrication method is large-area compatible and inexpensive. The proposed screens may be useful for position detection of objects, such as in the paper mover, in printers and copy machines.

29 Claims, 9 Drawing Sheets

MICROFABRICATED LIGHT COLLIMATING SCREEN

CROSS REFERENCE TO RELATED PATENTS AND APPLICATIONS

This application is related to U.S. application Ser. No. 10/980,334, filed Nov. 4, 2004, entitled "Elastic Microchannel Collimating Arrays and Method of Fabrication," naming David K. Biegelsen as an inventor.

BACKGROUND

By way of background, light collimating screens are used in many optical applications. These devices typically control the direction of light passing through the screen.

Light control films, or light collimating screens, have various applications such as contrast enhancement and improved sunlight readability for displays. Light collimating screens are also useful for ensuring confidential viewing on computer monitors so that unauthorized observers will have the line of sight blocked. Such films are also used to direct light to where it is needed and away from where it is not, e.g., to hide the light source in incandescent lighting.

Other industrial applications of light collimating screens are implemented where the direction of light is advantageously controlled, such as is in connection with optical sensing applications. In this regard, for example, light collimators are currently used as part of the paper mover in an image rendering device such as a printer. However, these screens restrict the viewing angle only in one direction. In order to achieve collimation in all in-plane directions, two screens would have to be laid on top of and oriented perpendicular to each other.

Figure 1:
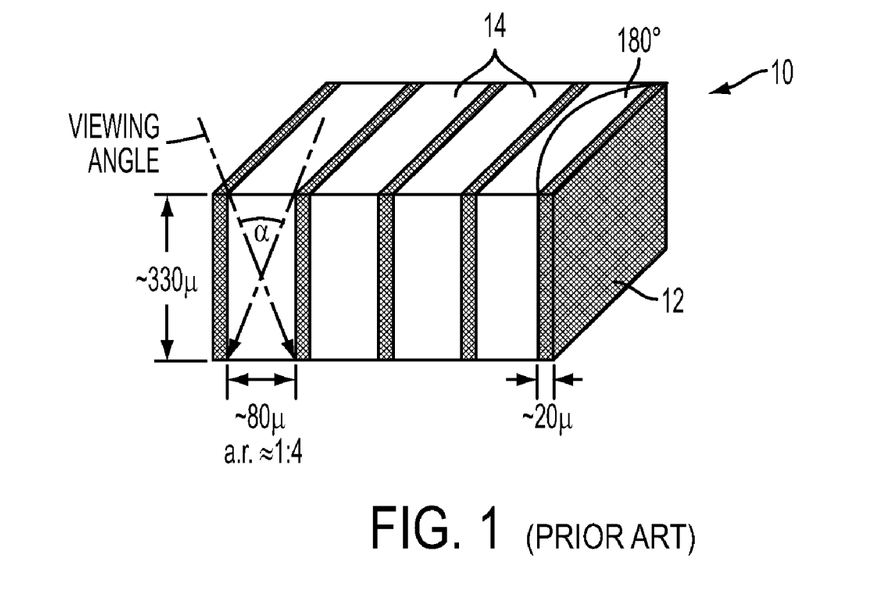
FIG. 1 is an illustration of a prior art structure.

Along these lines, commercially available light control films or screens generally comprise a plastic layer(s) containing closely spaced microlouvers. With reference to FIG. 1, a portion 10 of a light collimating screen is shown. The microlouvers, such as that shown at 12, are typically black in color and formed as equidistant polymeric walls. These walls are embedded in a transparent polymer material 14. The louvers, such as that shown at 12, simulate a tiny Venetian blind blocking out unwanted ambient light and controlling the direction of light. Typical films are about 330 microns thick. The black micro-louvers, such as that shown at 12, are about 20 microns wide and the regions filled with polymeric material 14 are about 80 microns wide. This results in a fill factor of 80% for the light channeling regions. The measured maximum viewing angle, as defined and illustrated in FIG. 1, is approximately 50 degrees. It should be noted that the walls are formed in these devices at angles of 0 degrees, as shown, or at other tilted angles, depending upon the application.

Figure 2:
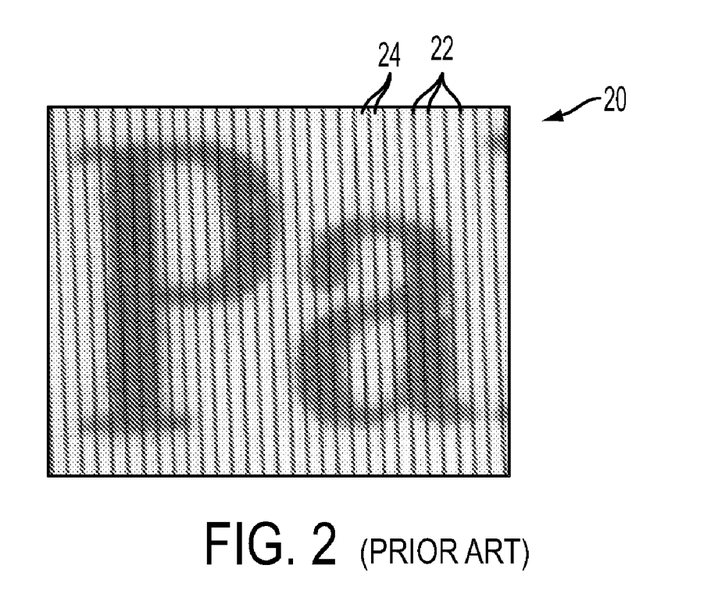
FIG. 2 is a further illustration of a prior art structure.

FIG. 2 illustrates an application of the conventional light collimating screen identified above. A portion 20 of a light collimating screen and an underlying display shows that the walls 22 are generally equidistant and spaced using a transparent polymeric material 24.

As should be apparent from FIGS. 1 and 2, the conventional light collimating screens collimate the light in only a single direction. As noted above, to achieve collimation in other directions, two screens would have to be layered and oriented perpendicular to each other.

For many applications, it would be advantageous to collimate light through a light collimating screen in more than a single direction.

INCORPORATION BY REFERENCE

U.S. application Ser. No. 10/980,334, filed Nov. 4, 2004, entitled "Elastic Microchannel Collimating Arrays and Method of Fabrication," naming David K. Biegelsen as an inventor, is incorporated herein by reference.

BRIEF DESCRIPTION

In one aspect the presently described embodiments, a light collimating screen comprises a substrate, a plurality of transparent high aspect ratio columns formed on the substrate and light absorbing material disposed between the columns.

In another aspect of the presently described embodiments, the light collimating screen further comprises a transparent cover layer positioned over the columns such that the columns extend between the transparent substrate and the transparent cover layer.

In another aspect of the presently described embodiments, the light collimating screen further comprises a layer of transparent adhesive between the columns and the transparent cover layer.

In another aspect of the presently described embodiments, the substrate comprises one of glass and polyester material.

In another aspect of the presently described embodiments, the plurality of columns is formed with a photopolymer material.

In another aspect of the presently described embodiments, the light absorbing material is black ink.

In another aspect of the presently described embodiments, the light absorbing material is a black polymer.

In another aspect of the presently described embodiments, the light absorbing material has two states.

In another aspect of the presently described embodiments, the light absorbing material is an electrophoretic ink or a guest-host polymer dispersed liquid crystal.

In another aspect of the presently described embodiments, the transparent cover layer is one of glass and a polyester material.

In another aspect of the presently described embodiments, substrate is transparent.

In another aspect of the presently described embodiments, the substrate is a device having optical elements aligned with the columns.

In another aspect of the presently described embodiments, the columns are disposed at an oblique angle relative to the substrate.

In another aspect of the presently described embodiments, a method for forming a light collimating screen comprises forming a plurality of high aspect ratio transparent columns on a surface and depositing light absorbing material between the columns.

In another aspect of the presently described embodiments, the surface is an exposed surface of a device having optical elements aligned with the columns.

In another aspect of the presently described embodiments, a method for forming a light collimating screen comprises forming a plurality of high aspect ratio transparent columns on a surface, bonding a transparent cover layer on ends of the columns and filling spaces defined by the columns, the surface, and the cover layer with light absorbing material.

In another aspect of the presently described embodiments, the surface is an exposed surface of a device having optical elements aligned with the columns.

In another aspect of the presently described embodiments, a light collimating screen comprises a substrate and a plurality of high aspect ratio light absorbing wall formations formed on the substrate, the plurality of wall formations defining a plurality of areas through which light may pass.

In another aspect of the presently described embodiments, the light collimating screen further comprises a transparent material disposed in the areas through which light passes.

In another aspect of the presently described embodiments, the substrate is one of glass and a polyester material.

In another aspect of the presently described embodiments, the light absorbing wall formations comprise a photopolymer material.

In another aspect of the presently described embodiments, the substrate is transparent.

In another aspect of the presently described embodiments, the substrate is a device having optical elements aligned with the areas through which light passes.

In another aspect of the presently described embodiments, the wall formations are disposed at an oblique angle relative to the substrate.

In another aspect of the presently described embodiments, a method for forming a light collimating screen comprises forming on a surface a plurality of high aspect ratio wall formations of transparent material, the wall formations defining a plurality of areas through which light may pass, and rendering the patterns of wall formations opaque.

In another aspect of the presently described embodiments, the method further comprises depositing transparent material in the areas through which light may pass.

In another aspect of the presently described embodiments, the rendering comprises subjecting the pattern to a thermal process.

In another aspect of the presently described embodiments, the rendering comprises applying a layer of light absorbing ink.

In another aspect of the presently described embodiments, the surface is an exposed surface of a device having optical elements aligned with the areas through which light may pass.

DETAILED DESCRIPTION

According to the presently described embodiments, a microfabricated light collimating screen is provided. The micro-fabricated screen, in one form, is made from a photo-imagable epoxy resin material, such as SU-8 (e.g., from Microchem Corp.) material. While SU-8 material is used in one form, any photopolymer or photo-polymerizable epoxy having a high aspect ratio will suffice, so long as it has a suitable cross-link density. The exemplary screen is operative to collimate light simultaneously in two dimensions. In many forms, improved degrees of collimation are also realized. The screen may be patterned on a substrate and fit to a particular application or it may be directly patterned onto image or light sensors or light sources in order to achieve direct collimation.

The contemplated configuration provides many other improvements over that which was heretofore known, including improved fabrication methods. These methods allow for large-area fabrication at relatively low costs. The screens contemplated and implemented according to the presently described embodiments have a variety of advantageous implementations. For example, light collimating screens according to the presently described embodiments may be useful for detection of the position of objects, such as in the paper mover, in printers and copy machines.

Figure 3:
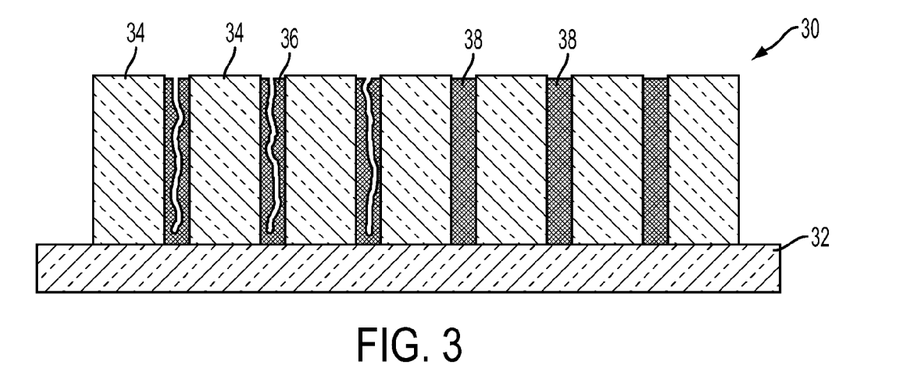
FIG. 3 is an illustration of an embodiment according to the presently described embodiments.

With reference to FIG. 3, a cross-sectional view of a light collimating screen 30 according to the presently described embodiments is illustrated. As shown, the screen 30 includes a substrate 32 having formed thereon columns or pillars 34. In one form, the substrate 32 is formed of a transparent material such as glass or a transparent polymer such as polyester, e.g. Mylar. As will be described in greater detail below, the substrate may actually take the form of a device having optical elements that are aligned with the columns or pillars 34.

In either case, the columns or pillars are formed of a transparent material or photo-resist material such as SU-8 material. In this regard, SU-8 material is transparent to visible light and it acts as the light channeling material. In one form, photolithographic techniques could be used to form the pillars or columns. For example, columns or pillars are formed in SU-8 by coating a surface with a layer of SU-8 polymer (e.g. by spin casting or extrusion). After a soft bake this polymer layer is then exposed through a photomask with UV light (e.g. 400 nm). In a following post-exposure bake, the exposed areas cross-link and the unexposed areas are subsequently dissolved with an SU-8 developer. Other forms of collimated radiation such as X-rays, electron beams or particle beams could also be used. In addition, other techniques may be used to form the columns or pillars contemplated by the presently described embodiments, provided that such techniques allow for creation of microstructures contemplated herein. Such microfabrication techniques may include etching, molding or embossing.

The use of SU-8 material provides many advantages for producing the contemplated devices. For example, use of this material makes high aspect-ratios realizable. Aspect ratios above 1:20 may be achieved for some applications. For other applications, aspect ratios of 1:10 may be sufficient. As an example, a 200 micron layer of SU-8 material formed on glass could be patterned with 20 micron pillars. The space between the pillars could be 20 microns.

The areas between the columns or pillars 34 are then filled with a light absorbing material, e.g. a black light absorbing material. These spaces may be filled with a black polymer. Alternatively, the walls of the columns may be coated with a light absorbing coating such as black ink. Black metal oxides or carbon particles may also provide the dark coating. Pigmented ink 36 and black silicone 38 are shown as example materials. Of course, while both are shown for ease of reference, only one of these types of light absorbing material would typically be used in a single light collimating screen formed according to the presently described embodiments.

Figure 4:
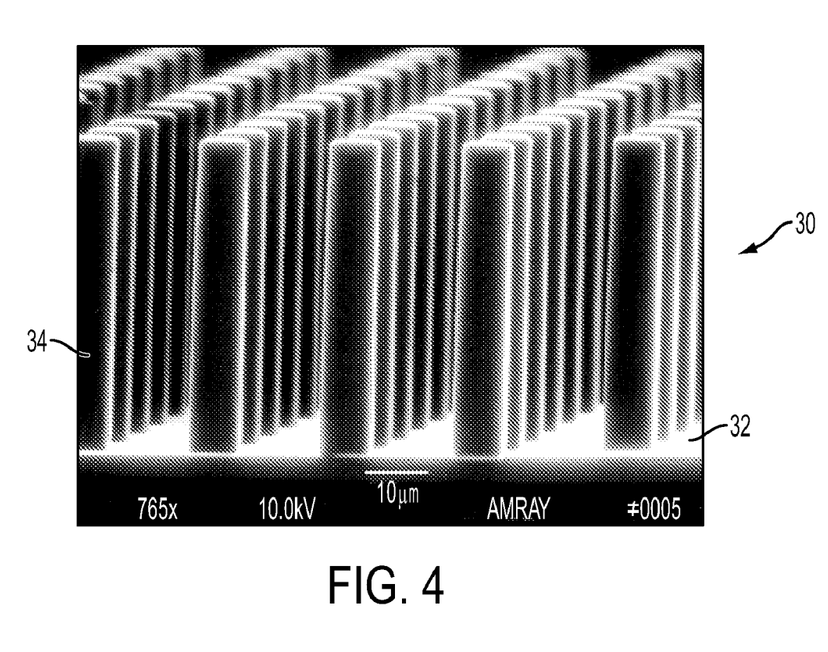
FIG. 4 is an illustration of an embodiment according to the presently described embodiments.

With reference to FIG. 4, a three-dimensional view of the screen 30 is illustrated. Note that the columns or pillars 34, formed of SU-8 material, are patterned on a glass substrate 32. The ~90 micron high pillars shown have an aspect-ratio of about 1:7. It should be appreciated that the light absorbing material 36 or 38 is not deposited in the screen 30 in the illustration.

Figure 5:
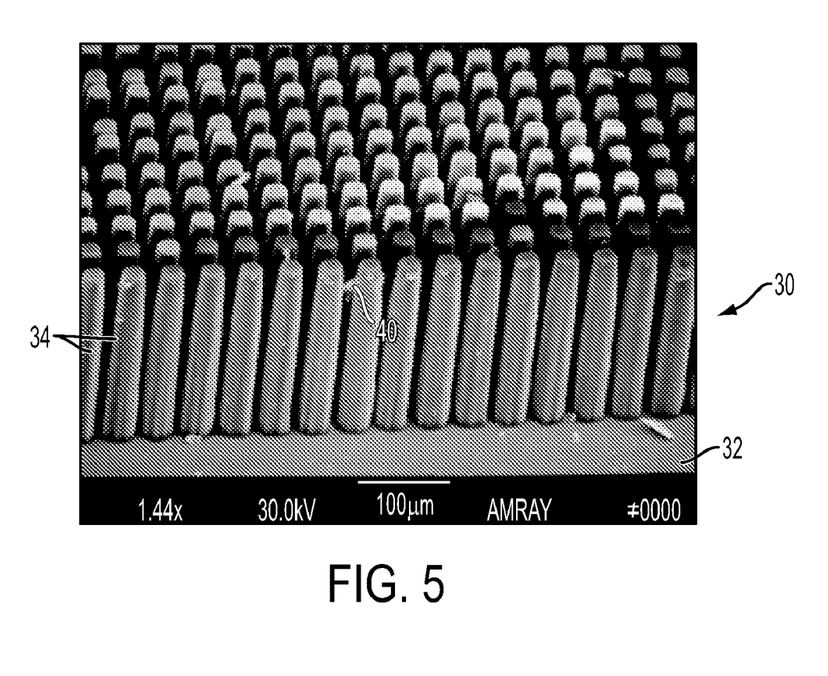
FIG. 5 is an illustration of an embodiment according to the presently described embodiments.

With respect to FIG. 5, a dense array of about 20 micron wide pillars or columns 34 on a substrate 32 is shown. The pillars or columns 34 may also be patterned with narrow bridges between them, such as that shown at 40, to avoid bending or deformation during the processing of the screen 30.

Figure 6:
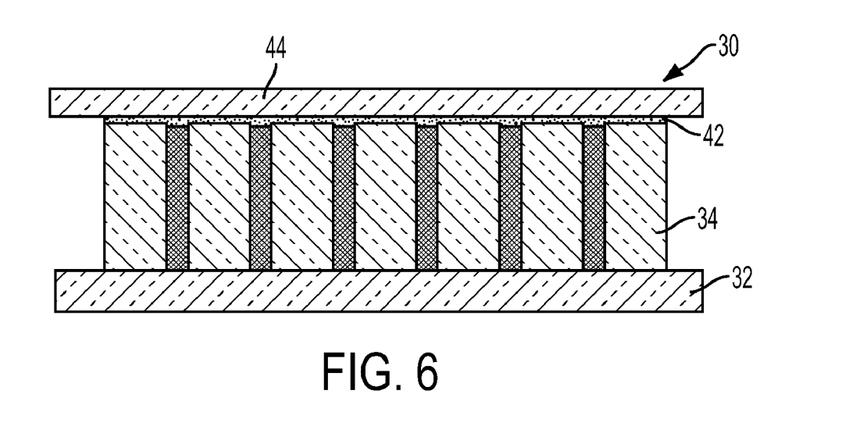
FIG. 6 is an illustration of an embodiment according to the presently described embodiments.

Referring now to FIG. 6, in a further embodiment, a transparent cover layer 44 may be bonded to the columns 34. To do so, in one form, an adhesive layer 42 may be applied (e.g. by roll-coating) to the tops of the columns. One example for an adhesive layer is a thin layer of UV curable adhesive such as Norland Optical Adhesive 60 (from Norland Products). Another example is a thin layer of SU-8 polymer. In this configuration, optical quality of the top surface may well be improved. Moreover, if the transparent cover layer is bonded to the columns 34 prior to the introduction of the light absorbing material to the screen assembly, then the configuration will prevent the light absorbing material, e.g. the black ink, from covering the top of the columns or pillars 34. As will be understood, this could degrade the visibility through the columns. In this manner, a light absorbing material such as ink may be spread between the pillars (and thus the substrate 32 and the cover layer 44) by capillary forces.

Figure 7:
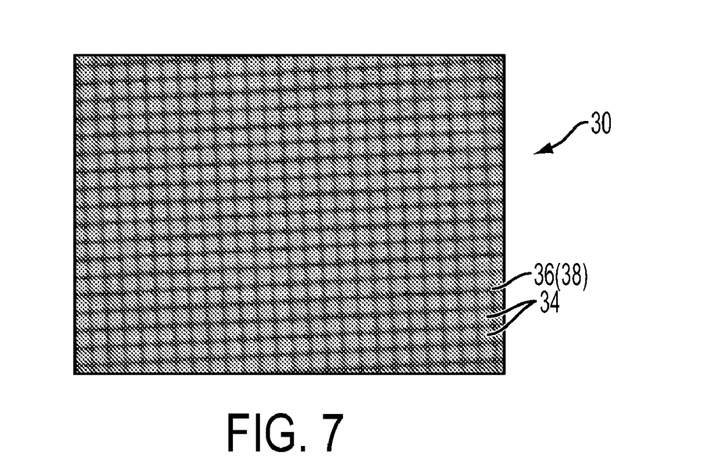
FIG. 7 is an illustration of an embodiment according to the presently described embodiments.

With reference now to FIG. 7, a top view of the screen 30 having a cover 44 over the columns or pillars 34 is shown. The columns or pillars 34 are sandwiched between two transparent, e.g. glass, plates (substrate 32 and cover layer 44 which are not in view because they are transparent). The space between the columns or pillars 34 is filled with a light absorbing material such as black ink 36. Note that light may pass through the areas corresponding to the pillars or columns 34 because the material used is transparent. Of course, light will not pass through the light absorbing material 36.

Bonding a cover plate to the top surface of the SU-8 pillars as shown in FIGS. 6 and 7 provides many advantages. First, it reduces scattering if the surface of the SU-8 material has become rough during processing (e.g., because of softening during the development step). In at least one form, the adhesive layer 42 is optically matched to the SU-8 material. Second, during filling with the black material (ink), the surface is protected. Otherwise, particles could be absorbed on the surface or the surface could become scratched when wiping off excess material. The space between the pillars can still be easily filled if the black liquid has a low viscosity. Capillary forces suck the liquid in.

Figure 8A:
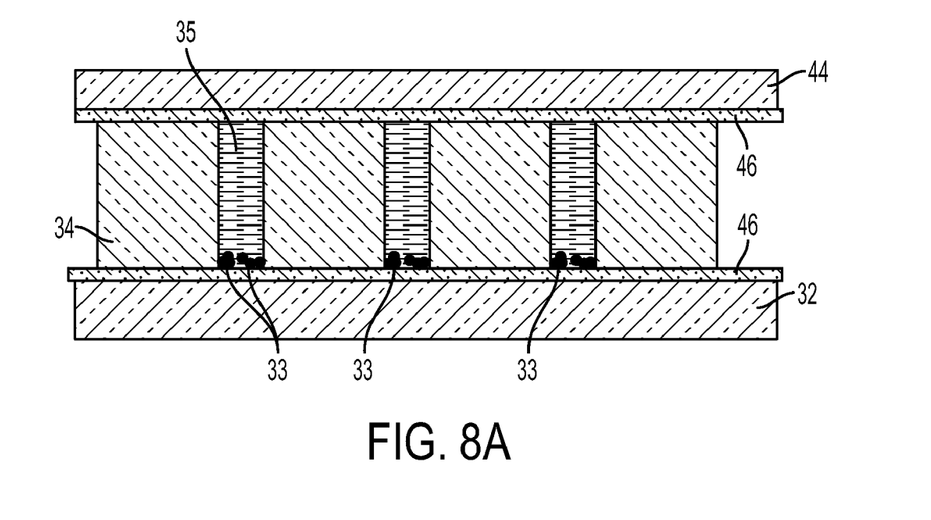
FIG. 8 is an illustration of an embodiment according to the presently described embodiments.
Figure 8B:
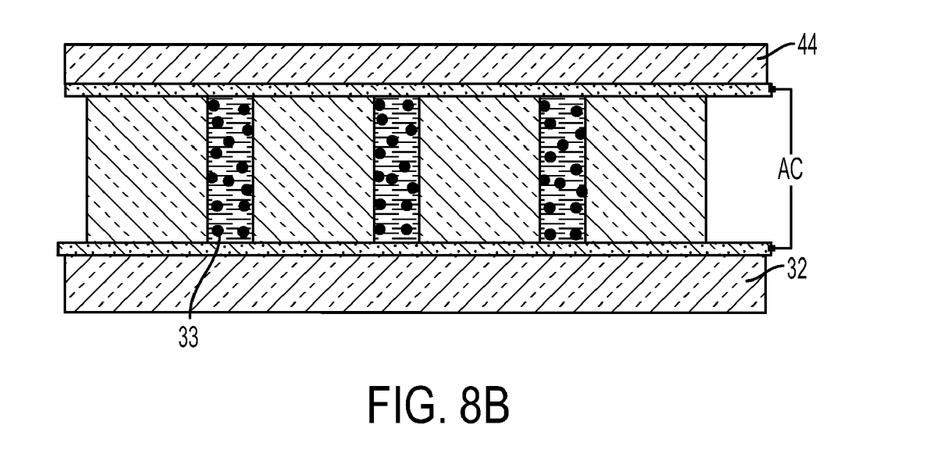

It should also be understood that the light absorbing material that is used may also have two states. In some applications, it may be useful to switch the collimating screen from an active collimating screen to an almost transparent screen. For example, there may be circumstances where a user wishes to implement a privacy screen but may, at other times, wish to deactivate the privacy screen. So, a material may be used that could be switched between a dark state and a transparent state upon application of a current, voltage or thermal excitation. One example for such material is an electrophoretic material such as electrophoretic ink comprising a transparent carrier fluid and charged black particles. With reference to FIG. 8(*a*), in the transparent state, the dark light absorbing particles 33 are concentrated (e.g. by means of an electric field) along a corner at the bottom between transparent pillars 34. In this state, the dark particles 33 are hardly visible to the observer. Ideally, the transparent carrier fluid 35 is optically matched to the material of the transparent pillars 34. In the dark state the particles are dispersed between the transparent pillars, e.g. by applying an AC (alternating current) electric field which agitates the charged particles. Another example of a material that can be switched between a dark and a transparent state would be a guest-host polymer dispersed liquid crystal with a light-absorbing dye as the 'guest'. See, e.g., Mc Ardle, Pure &Appl. Chem, Vol 68, No 7, pp 1389-1394 (1996), which is incorporated herein by reference. The material may also be bi-stable, which means the dark or transparent state stays when the external excitation is switched off. In most cases, this material would be arranged in the configuration shown in FIGS. 8(*a*) and 8(*b*) where a top plate 44 serves to 'encapsulate' the material. Moreover, the top plate 44 and bottom plate 32 may be coated with a transparent conductive coating 46 such as indium-tin-oxide (ITO) to provide electrical contacts for the excitation.

Figure 9:
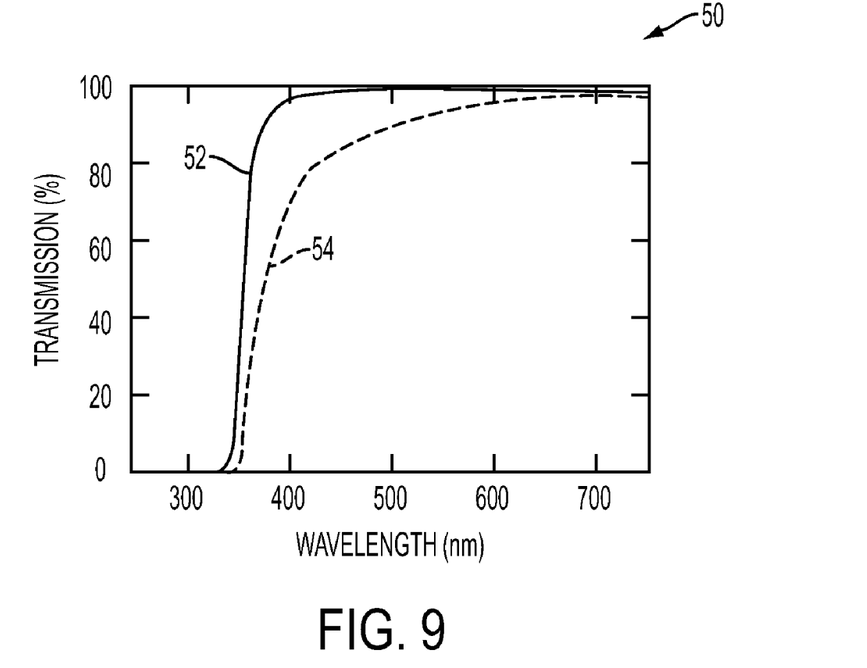
FIG. 9 is a graph illustrating evolution of light transmission as a function of time for SU-8 materials.

With reference to FIG. 9, it is noted that the use of SU-8 material may result in some slight degradation in visibility therethrough over time. More specifically, the graph 50 shows light transmission curves for SU-8 over time. Curve 52 represents light transmission shortly after development. Curve 54 illustrates light transmission after approximately eight (8) weeks. In either case, SU-8 material has a high transparency in the visible range. As will be understood by those of skill in the art, the slight decrease in the transparency with time may be overcome by reducing the amount of photoinitiator in the SU-8.

Figure 10:
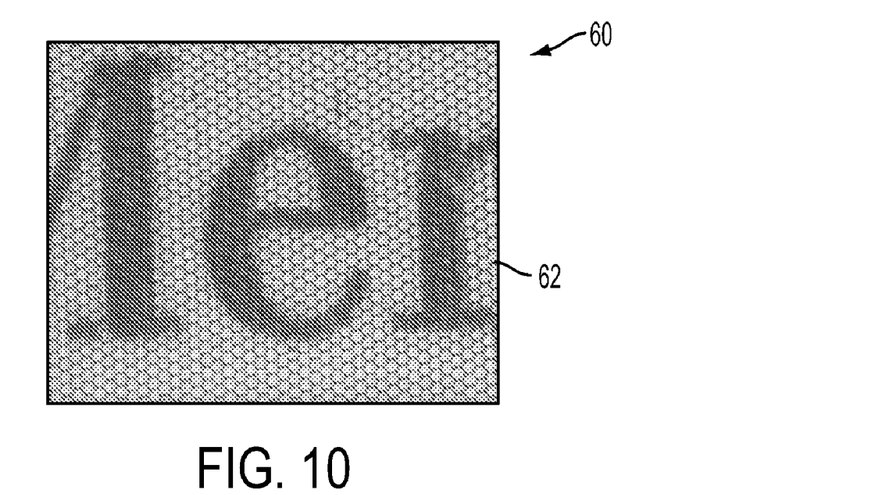
FIG. 10 is an illustration of an embodiment according to the presently described embodiments.

With reference now to FIG. 10, another embodiment is illustrated. In this embodiment, the collimating screen 60 is fabricated by patterning a light transmitting material such as, SU-8 material, in wall formations such as wall formations shown at 62. The wall formations are subsequently rendered opaque. Those of skill in the art will appreciate that achieving high aspect ratio wall is not without its challenges. However, using SU-8 material, walls with high aspect-ratios may be achieved. Furthermore, by combining conventional SU-8 processing with subsequent reactive ion etching even higher aspect ratios may be achieved. For example, a plasma of oxygen and SF4 (sulfur tetrafluoride) etches the SU-8 walls and renders them narrower. Once the wall formations, such as that shown at 62, are rendered opaque, it should be apparent that such opaque walls define areas through which light may pass. It should be appreciated that these areas may remain empty or, during the process, filled with a transparent polymer such as an epoxy, an acrylic or a silicone.

In one form, the transparent SU-8 walls are rendered opaque by a thermal process. More specifically, the thermal process contemplated involves a heating step in air at a temperature around 300 degrees Celsius or above. At this temperature, the SU-8 material turns dark due to carbonization of the material. This is apparent as shown in FIG. 9. However, in this method, it should be understood that the stress between the substrate and the SU-8 may become high. As such, the SU-8 material is, in at least one form, patterned in a way that reduces the buildup of stress. For example, the walls could be patterned with small gaps to relieve stress.

Figure 11:
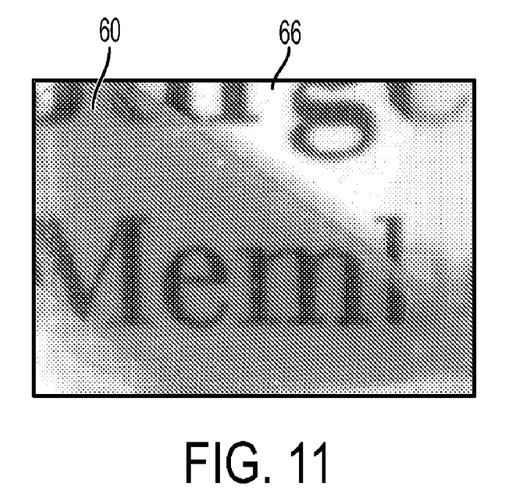
FIG. 11 is an illustration of an embodiment according to the presently described embodiments.
Figure 12:
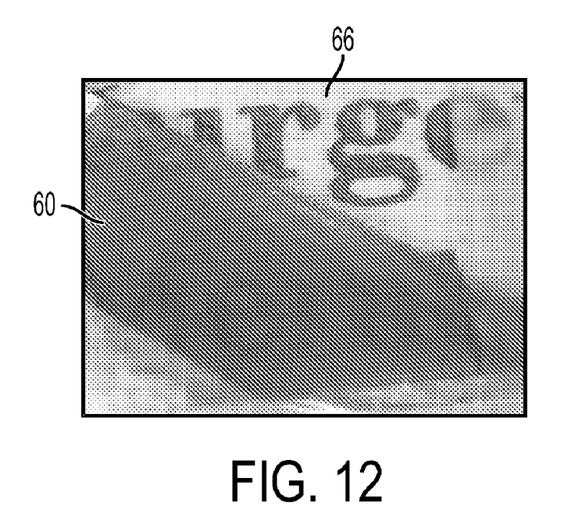
FIG. 12 is an illustration of an embodiment according to the presently described embodiments.

FIG. 10 is a partially carbonized SU-8 honeycomb pattern on a glass substrate. In this process, the SU-8 becomes dark after a bake at 300 Degrees Celsius. In one form, the thickness of the SU-8 layer is 120 microns and the cells are about 67 microns in diameter. FIG. 11 shows a further application at a view normal to the surface. The underlying material 66 is visible. Referring to FIG. 12, the view is at approximately 32 degrees to the normal. The underlying material 66 is not clearly visible here. Thus, even though the aspect ratio of the SU-8 cells in this example is relatively small (near 1:2) and the wall formations are only partially carbonized, the images clearly illustrate the advantages of the light collimating screens according to the presently described embodiments.

In another form, the wall formations are rendered opaque by applying a coat of light absorbing material thereto. For example, a wall formation pattern of SU-8 material may be coated with a thin (several hundred nm to several microns) layer of black ink. This can be accomplished by immersing the sample in ink and subsequently blow-drying. The pigments of the ink adhere to the wall surface and render the material dark. However, in this method, it should be understood that the wall formation, or grid, of SU-8 material should be released from the substrate prior to the coating process. Otherwise, the substrate may be coated as well. Alternatively, the substrate on which the wall formation is patterned may be treated in a manner that repels the ink.

As noted above, there are many applications for light collimating screens. One application for light collimating screens lies in displays to reduce glare and to enhance the contrast. Furthermore, light collimating screens may be used for privacy viewing so that unauthorized observers will have their line of sight blocked. Light collimating screens are also used for precisely detecting the position of objects such as the position of a sheet of paper in the paper mover, or for precisely defining the solid angle within which a light source of light element can be viewed. An example of the latter is a three dimensional display.

As alluded to above, the collimating screen may be patterned directly onto the light sensor or it may be patterned on top of the light source to direct the light.

Figure 13:
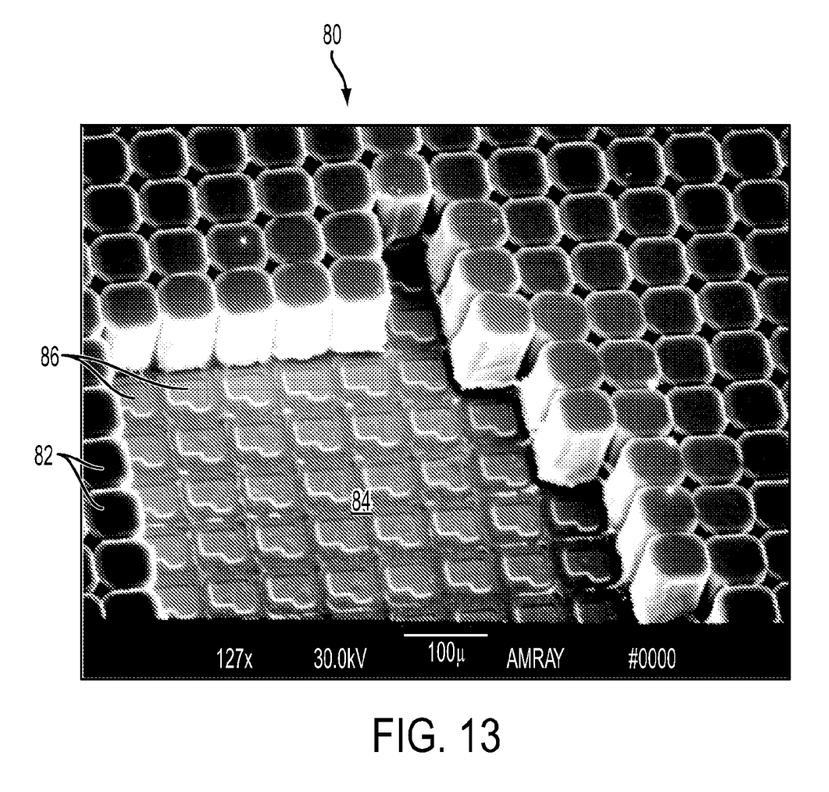
FIG. 13 is an illustration of an embodiment according to the presently described embodiments.

With reference to FIG. 13, the light collimating screen 80 having columns or pillars 82 was patterned directly onto an amorphous silicon photosensor array 84. The array 84 also includes a plurality of optical elements, e.g. photo sensors such as p-i-n photodiodes. One such sensor is shown at 86. In one form, the columns or pillars are aligned with the sensors. Otherwise, overlaying polymer screens may result in misalignment, especially if the screen and the substrate have different thermal expansion coefficients.

In FIG. 13, the exemplary configuration shows SU-8 pillars 82 formed on an image sensor array 84 with 75 micron pixel pitch. In this example, the SU-8 material is 100-150 microns thick. To complete the light collimating screen, the space between the pillars would be filled with light absorbing material such as black ink. An alternative version could have carbonized (as in FIG. 10) SU-8 walls patterned in between the pixels.

Figure 14:
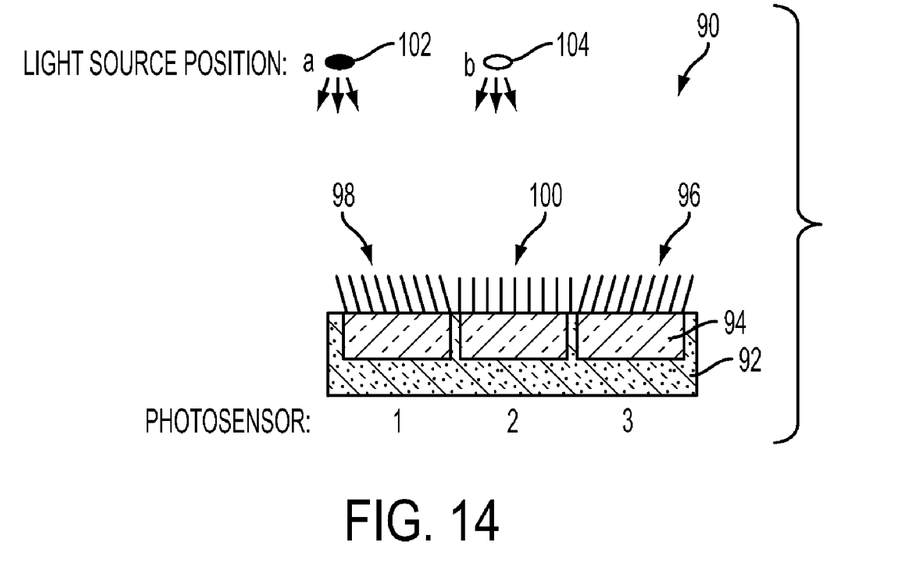
FIG. 14 is an illustration of an embodiment according to the presently described embodiments; and, FIG. 15 is a graph illustrating application of the embodiment of FIG. 14.

The light collimating screen, specifically in one form the SU-8 material, may also be patterned at an oblique angle as described in Hung et al., J. Micromech. Microeng. 14, 975-983 (2004). This would result in light collimating screens which are sensitive to a pre-defined direction. As shown in FIG. 14, a system 90 having a sensor 92 can be formed which detects the direction of a light source, such as light sources 102 and 104. To accomplish this configuration, the sensor 92, having optical elements 94 disposed thereon, has a light collimating screen with portions 96, 98 and 100 having varying angles of collimation. The structure would be fabricated by exposing the photopolymer through a photomask in the three regions 1, 2 and 3 at three different angles of incident radiation (e.g UV radiation or X-ray radiation). In this manner, only light incident on the sensor 92 at specific angles is detected or the position of the light source may be sensed by reading out the amplitude of the sensor signals in the three different sensor regions 1, 2 and 3. The same principle applied to a wide light source would result in light emitted in defined directions only. It should be understood that the oblique angle contemplated here may be applied to columns or pillars, or to wall formations.

Figure 15:
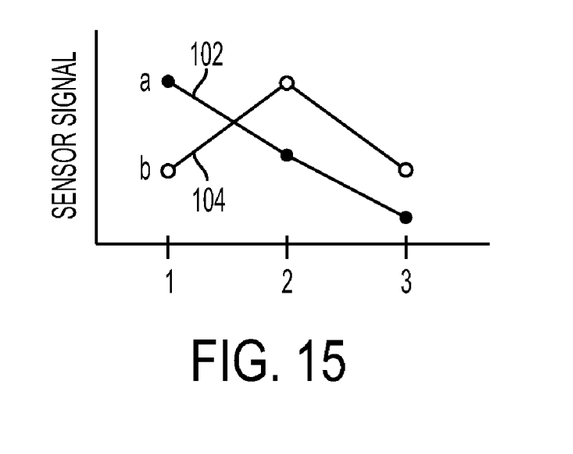

FIG. 15 graphically illustrates the concept of FIG. 14. As shown, the position of a light source (102, 104) can be detected with an array of photosensors 94 positioned at positions 1, 2 and 3 of the sensor. The sensor signal varies as a function of the angle at which the corresponding portion of the light collimating screen is disposed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A light collimating screen comprising:
   a substrate;
   a plurality of transparent high aspect ratio columns formed on the substrate; and,
   light absorbing material disposed between the columns, wherein the screen is operative to collimate light in two dimensions.

2. The light collimating screen as set forth in claim 1 further comprising a transparent cover layer positioned over the columns such that the columns extend between the substrate and the transparent cover layer.

3. The light collimating screen as set forth in claim 2 further comprising a layer of transparent adhesive between the columns and the transparent cover layer.

4. The light collimating screen as set forth in claim 1 wherein the substrate comprises one of glass and a transparent polymer material.

5. The light collimating screen as set forth in claim 1 wherein the plurality of columns are formed with a photopolymer material.

6. The light collimating screen as set forth in claim 1 wherein the light absorbing material is black ink.

7. The light collimating screen as set forth in claim 1 wherein the light absorbing material is a black polymer.

8. The light collimating screen as set forth in claim 1 wherein the light absorbing material has a transparent state and an opaque state.

9. The light collimating screen as set forth in claim 1 wherein the light absorbing material is an electrophoretic ink or a guest-host polymer dispersed liquid crystal.

10. The light collimating screen as set forth in claim 1 wherein the transparent cover layer is one of glass and a transparent polymer material.

11. The light collimating screen as set forth in claim 1 wherein the substrate is transparent.

12. The light collimating screen as set forth in claim 1 wherein the substrate is a device having optical elements aligned with the columns.

13. The light collimating screen as set forth in claim 1 wherein the columns are oriented at an oblique angle relative to the substrate.

14. A method for forming a light collimating screen comprising:
   forming a plurality of high aspect ratio transparent columns on a surface; and,
   depositing light absorbing material between the columns, wherein the screen is operative to collimate light in two dimensions.

15. The method as set forth in claim 14 wherein the surface is an exposed surface of a device having optical elements aligned with the columns.

16. A method for forming a light collimating screen comprising:
   forming a plurality of high aspect ratio transparent columns on a surface;
   bonding a transparent cover layer on ends of the columns; and,
   filling spaces defined by the columns, the surface, and the cover layer with light absorbing material, wherein the screen is operative to collimate light in two dimensions.

17. The method as set forth in claim 16 wherein the surface is an exposed surface of a device having optical elements aligned with the columns.

18. A light collimating screen comprising:
   a substrate; and,
   a plurality of high aspect ratio light absorbing wall formations formed on the substrate, the plurality of wall formations defining a plurality of areas through which light may pass, wherein the screen is operative to collimate light in two dimensions.

19. The light collimating screen as set forth in claim 18 further comprising a transparent material disposed in the areas through which light passes.

20. The light collimating screen as set forth in claim 18 wherein the substrate is one of glass and a transparent polymer material.

21. The light collimating screen as set forth in claim 18 wherein the light absorbing wall formations comprise a photopolymer material.

22. The light collimating screen as set forth in claim 18 wherein the substrate is transparent.

23. The light collimating screen as set forth in claim 18 wherein the substrate is a device having optical elements aligned with the areas through which light passes.

24. The light collimating screen as set forth in claim 18 wherein the wall formations are oriented at an oblique angle relative to the substrate.

25. A method for forming a light collimating screen comprising:
   forming on a surface patterns of a plurality of high aspect ratio wall formations of transparent material, the wall formations defining a plurality of areas through which light may pass; and,
   rendering the patterns of wall formations opaque.

26. The method as set forth in claim 25 further comprising depositing transparent material in the areas through which light may pass.

27. The method as set forth in claim 25 wherein the rendering comprises subjecting the patterns to a thermal process.

28. The method as set forth in claim 25 wherein the rendering comprises applying a layer of light absorbing ink.

29. The method as set forth in claim 25 wherein the surface is an exposed surface of a device having optical elements aligned with the areas through which light may pass.

* * * * *